(12) United States Patent
Shinoda

(10) Patent No.: US 7,809,093 B2
(45) Date of Patent: Oct. 5, 2010

(54) MOBILE TERMINAL

(75) Inventor: Yusuke Shinoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 731 days.

(21) Appl. No.: 10/882,938

(22) Filed: Jul. 1, 2004

(65) Prior Publication Data
US 2005/0190735 A1 Sep. 1, 2005

(30) Foreign Application Priority Data
Feb. 27, 2004 (JP) ............................. 2004-053843

(51) Int. Cl.
H04L 27/06 (2006.01)
H04L 23/00 (2006.01)
H04B 1/707 (2006.01)

(52) U.S. Cl. ................... 375/343; 375/377; 375/149; 375/150; 375/152

(58) Field of Classification Search ................ 375/130, 375/145, 140–143, 147, 149, 150, 152; 370/331–333, 370/329, 335, 336, 341, 342, 441; 455/436, 455/437, 442
See application file for complete search history.

(56) References Cited

U.S. PATENT DOCUMENTS

| 6,438,358 | B1 | 8/2002 | Higuchi | |
|---|---|---|---|---|
| 7,436,879 | B1 * | 10/2008 | Iwamoto et al. | 375/150 |
| 2003/0095516 | A1 * | 5/2003 | Ok et al. | 370/331 |
| 2003/0236079 | A1 | 12/2003 | Hasegawa | |
| 2004/0033791 | A1 * | 2/2004 | Schmidl et al. | 455/137 |
| 2004/0071119 | A1 * | 4/2004 | Ishikawa et al. | 370/335 |
| 2004/0242248 | A1 * | 12/2004 | Goldberg et al. | 455/502 |
| 2005/0213644 | A1 * | 9/2005 | Iwamoto et al. | 375/149 |

FOREIGN PATENT DOCUMENTS

| EP | 1 337 041 | 8/2003 |
|---|---|---|
| EP | 1 367 844 | 12/2003 |
| JP | 2003-244083 | 8/2003 |
| JP | 2003-348648 | 12/2003 |
| JP | 2004-007760 | 1/2004 |

OTHER PUBLICATIONS

Lee et al., "Cell Search Scheme using I/Q Multiplexed Code Assignment in Asynchronous W-CDMA System," IEE, 1999, pp. 1560-1564.*
Tanno et al., "Three-Step Fast Cell Search Algorithm Utilizing Common Pilot Channel for OFCDM Broadband Packet Wireless Access," IEEE 2002, pp. 1575-1578.*
Kim, "Fast cell search using I/Q multiplexed code under hierarchical cell structure," IEEE, 2998, pp. 850-851.*

(Continued)

Primary Examiner—Tesfaldet Bocure
(74) Attorney, Agent, or Firm—Katten Muchin Rosenman LLP

(57) ABSTRACT

To provide a mobile terminal capable of shortening the time required for deciding whether a terminal is located within the range of an area frequency at the time of the terminal power switched on, and securely performing location registration to a cell producing a large electric field intensity by recognizing an area frequency in advance.

6 Claims, 14 Drawing Sheets

OTHER PUBLICATIONS

European Search Report dated Jun. 22, 2005.
Qualcomm. Qualcomm Announces Radio Frequency Solution to Support 800 Mhz WCDMA (UMTS) Band. Freshnews.com, Feb. 23, 2004, http://freshnews.com/news/telecom-wireless/article_16897.html?QUALCOMM.
3GPP TSG RAN WG1: TS 25.214 V1.0.0: Physical Layer Procedures, Apr. 1999.
Notification of Reason for Rejection dated Dec. 2, 2008, from the corresponding Japanese Application.
European Office Action dated Oct. 21, 2008, from the corresponding European Application.
QUALCOMM Incorporated "QUALCOMM Announces Radio Frequency Solution to Support 800MHz WCDMA (UMTS) Band", Feb. 23, 2004, http://www.ittoolbox.com/press/pr.asp?i=110075.
Mario Kiessling, et al. "Performance Enhancements to the UMTS (W-CDMA) Initial Cell Search Algorithm", Communications, 2002, ICC 2002, Aug. 7, 2002, pp. 590-594.
Yi-Pin Eric Wang, et al. "Cell Search in W-CDMA" IEEE Journal on Selected Areas In Communications, vol. 18, No. 8, Aug. 2000, pp. 1470-1482.
Notification of Reason for Rejection, dated Feb. 24, 2009 for the corresponding Japanese Patent Application JP 2004-083843.

* cited by examiner

MOBILE TERMINAL

FIELD OF THE INVENTION

The present invention relates to a Mobile Station or User Equipment (hereafter referred to as mobile terminal) in a mobile communication system conforming to the 3GPP (3rd Generation Partnership Project) specification for W-CDMA (Wideband Code Division Multiple Access) systems.

BACKGROUND OF THE INVENTION

In a mobile communication system, establishing radio link connection is required between base stations and mobile terminals. A different plurality of frequencies included in a predetermined frequency bandwidth are employed as frequencies to be transmitted from a plurality of base stations. Each base station transmits an effective radio wave on a frequency selected from among these plurality of frequencies.

When the mobile terminal power is switched on, or when the mobile terminal moves outside a service area, in order to establish a radio link between the mobile terminal and a base station, the mobile terminal performs cell search for finding out where the effective radio wave is existent, namely, for searching a cell to which the radio link to be connected.

FIG. 1 shows a frame structure to be transmitted from the base station for performing this cell search. In FIG. 1, each radio frame length is 10 msec and has 15 slots (slot #0-#14). From each base station, one symbol of a common physical channel referred to as Synchronization Channel (SCH), which includes two kinds of synchronization channels (Primary SCH and Secondary SCH), having a length of 256 chips/symbol is transmitted in the top position of each slot at certain intervals.

It is known that the cell search in the W-CDMA system is performed according to the following three steps, using the above frame structure (Non-patent document, 'W-CDMA Ido Tsushin Houshiki (Mobile Communication System)' pp.35-37, supervised by Keiji Tachikawa, published by Maruzen Co., Ltd.).

First step=PSC: Detection of Primary Search Code
Second step=SSC: Detection of Secondary Search Code
Third step=SC: Detection of Scrambling Code Namely, in the first step (=PSC), reception timing is detected using a system common code ACp of the Primary SCH. In the second step (=SSC), using 16 kinds of codes in the Secondary SCH, a scramble code group number (1-64) located in a certain position of each slot is identified, and the reception timing of the scrambling code is detected.

Next, in the third step (=SC), the scrambling code number is detected in Common Pilot Channel (CPICH) in which a known pilot pattern of 15 kbps is transmitted.

The above process is performed by switching frequencies, and a location registration is performed based on the decision of a cell from which the radio wave frequency producing the strongest intensity among the received radio waves is transmitted.

As inventions enabling the above band search processing, a variety of proposals have been disclosed up to the present. For example, one method is that selecting a bandwidth producing the maximum receiving power among the entire bandwidths, thereafter performing cell search by identifying the code, and deciding the bandwidth by the receiving signal code power (RSCP) (Japanese Patent Publication No. 2003-348648).

According to another invention, there has been disclosed a method of dividing a frequency bandwidth into a plurality of groups, selecting a group from the receiving power of a representative frequency, and deciding an area frequency by obtaining receiving power for each frequency (Japanese Patent Publication No. 2003-244083).

PROBLEMS TO BE SOLVED BY THE INVENTION

In a W-CDMA radio communication system, a problem such as system capacity saturation arises as the number of subscribers increases. In order to solve this problem, there is a case of an area service provided by using a frequency band (for example, 800 MHz band) which is widely different from the standard frequency band (for example, 2 GHz band).

In this case, in a portable telephone terminal used as a mobile terminal in the W-CDMA system, mounting two radio function units is required in a radio analog section, so as to handle the two widely different transmitting/receiving frequencies.

At this time, in one radio function unit corresponding to one frequency band which is assumed to be a standard frequency band, cell detection is performed first throughout this frequency band. If no cell is detected in this frequency band, then cell detection is performed by functioning the other radio function unit.

This necessitates a substantially long time to determine that the mobile terminal is presently located inside a certain service area, when the terminal power is firstly switched on in a location having a different area frequency. In addition, even when an electric field intensity of the frequency band which is assumed to be a standard band is substantially lower than that of the other frequency band, as far as this intensity value is greater than the minimum electric field required for location registration, the location registration is performed for the lower electric field intensity. As a result, when a radio wave condition is varied, the terminal may easily be shifted to a state of being located outside the service area.

In any cases of the aforementioned non-patent document, patent publications, no commitment was disclosed against the problem of cell search, in case of using different frequency bands to cope with the system capacity saturation. Namely, no means has been suggested so far to solve the above-mentioned problem.

SUMMARY OF THE INVENTION

Accordingly, considering the above problematic point, it is an object of the present invention to provide a mobile terminal having no less than two radio function unit corresponding to no less than two frequency bands used in a radio communication system employing the W-CDMA system, and enabling shortening the time required for deciding whether the terminal can communicate at the range of an area frequency at the time of the power switched on, as well as secure location registration to a cell supplying high electric field intensity by recognizing an area frequency in advance.

In order to achieve the above-mentioned object, as a first aspect of the present invention, a mobile terminal for use in a radio communication system employing W-CDMA system having a plurality of frequency bands, includes: a plurality of radio function units corresponding to the plurality of frequency bands; a circuit for acquiring a correlation value between each signal received in the plurality of radio function units and a primary search code in each synchronization channel of the plurality of frequency bands; an integration circuit integrating outputs of the circuit for acquiring the correlation value; and a peak value detection circuit detecting peak values in the outputs of the integration circuit and comparing the detected peak values among the plurality of frequency bands. The peak value detection circuit determines a frequency band which includes the frequency having the greatest detected peak value as area frequency band and sets said frequency having the greatest detected peak value as center frequency.

As a second aspect of the mobile terminal to attain the aforementioned object, in the first aspect, outputs of the plurality of radio function units are switched frame by frame, each frame having a plurality of slots, and then input to the circuit for acquiring the correlation value.

As a third aspect of the mobile terminal to attain the aforementioned object, in the first aspect, the mobile terminal further includes a multiplexer. Outputs of the plurality of the radio function units are input to the multiplexer, and the outputs of the plurality of the radio function units are alternately selected and multiplexed slot by slot in a frame having a plurality of slots.

As a fourth aspect of the mobile terminal to attain the aforementioned object, in the first aspect, the mobile terminal further includes a multiplexer. Outputs of the plurality of the radio function units are alternately selected slot by slot in a frame having a plurality of slots, and then input to the multiplexer, and thereby the outputs of the plurality of radio function units are alternately multiplexed.

As a fifth aspect of the mobile terminal to attain the aforementioned object, a mobile terminal for use in a radio communication system employing W-CDMA system having a plurality of frequency bands, includes: a plurality of radio function units corresponding to the plurality of frequency bands; a switch successively switching the plurality of radio function units and outputting an I/Q orthogonal signal of a corresponding frequency band; a matched filter calculating a correlation power value between a primary search code in a synchronization channel and the I/Q orthogonal signal at slot intervals for each oversampling; an integration circuit integrating each calculated correlation power value in a predetermined integration time; a means extracting peak points from among the outputs of the integration circuit, sorting the extracted peak points, and detecting higher-rank paths of the correlation power values; and a means determining an area frequency by comparing the peak correlation power values retained before in regard to the detected higher-rank paths.

As a six aspect of the mobile terminal to attain the aforementioned object, a mobile terminal for use in a radio communication system employing W-CDMA system having a plurality of frequency bands, includes: a plurality of radio function units which corresponds to the plurality of frequency bands and outputs an orthogonal signal from each input signal of the corresponding frequency band; a switch which switches the plurality of radio function units corresponding to the plurality of frequency bands; an A/D converter which converts each orthogonal signal from the plurality of radio function units into a digital I/Q signal; a multiplexer which performs time-division multiplexing of the digital I/Q signals from the A/D converter; a matched filter which calculates a correlation power value between an output of the multiplexer and a primary search code at slot intervals of a frame having a plurality of slots for each oversampling; a power value output circuit integrating outputs of the matched filter for each I/Q signal, and outputting integrated correlation power values; a means extracting peak points from among the outputs of the power value output circuit, sorting the extracted peak points, and detecting higher-rank paths of the correlation power values; and a means determining an area frequency by comparing the peak correlation power values stored in a memory in regard to the detected higher-rank paths.

As a seventh aspect of the mobile terminal to attain the aforementioned object, in a mobile station requiring acquisition timing for despreading a pilot signal at least by successively detecting correlation with a plurality of kinds of synchronization signals having been spread with a spread code when detecting the pilot signal satisfying a receiving condition criterion among pilot signals being spread with the spread code, said mobile station includes: when a set of the pilot signals and the plurality kinds of the synchronization signals corresponding to the pilot signals are respectively transmitted using a first frequency and a second frequency, a detecting means detecting both the correlation related to any synchronization signal among the plurality kinds of the synchronization signals in the first frequency and the correlation related to the corresponding synchronization signal in the second frequency; and a selection means extracting the synchronization signal having greater correlation among the synchronization signals either in the frequency side producing greater correlation or in both the first frequency and the second frequency, and despreading for pilot signal after acquiring the timing first in regard to the synchronization signal having greater correlation, and when a criterion is satisfied, selecting as an object cell for gaining access or moving in.

According to the present invention, in a mobile terminal having no less than two radio function unit corresponding to no less than two frequency bands used in a radio communication system employing the W-CDMA system, it becomes possible to shorten a time required for deciding an available frequency the terminal uses to communicate at the time of the power switched on. Also, a secure location registration to a cell supplying high electric field intensity can be attained by recognizing an area frequency in advance.

Further, by multiplexing, a radio wave condition in a location can be detected real time within a short time, only by a single radio unit at the time of the PSC detection.

Further scopes and features of the present invention will become more apparent by the following description of the embodiments with the accompanied drawings.

DETAILED DESCRIPTION OF THE PREFERRED EMBODIMENTS

The preferred embodiment of the present invention is described hereinafter referring to the charts and drawings. However, the scope of the present invention is not limited to the embodiments described below.

First Embodiment

Figure 1:
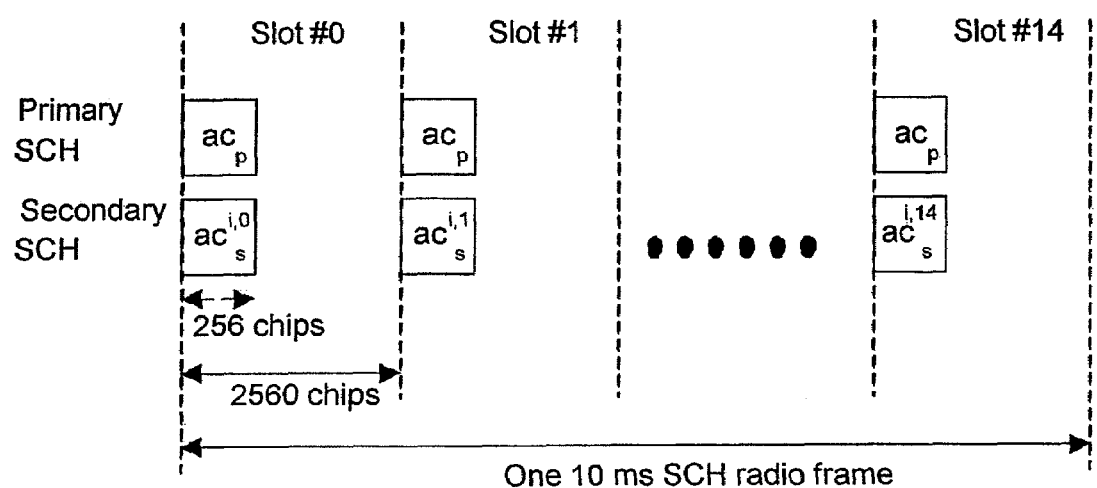
FIG. 1 shows a diagram illustrating a frame structure transmitted from a base station for the cell search.
Figure 2:
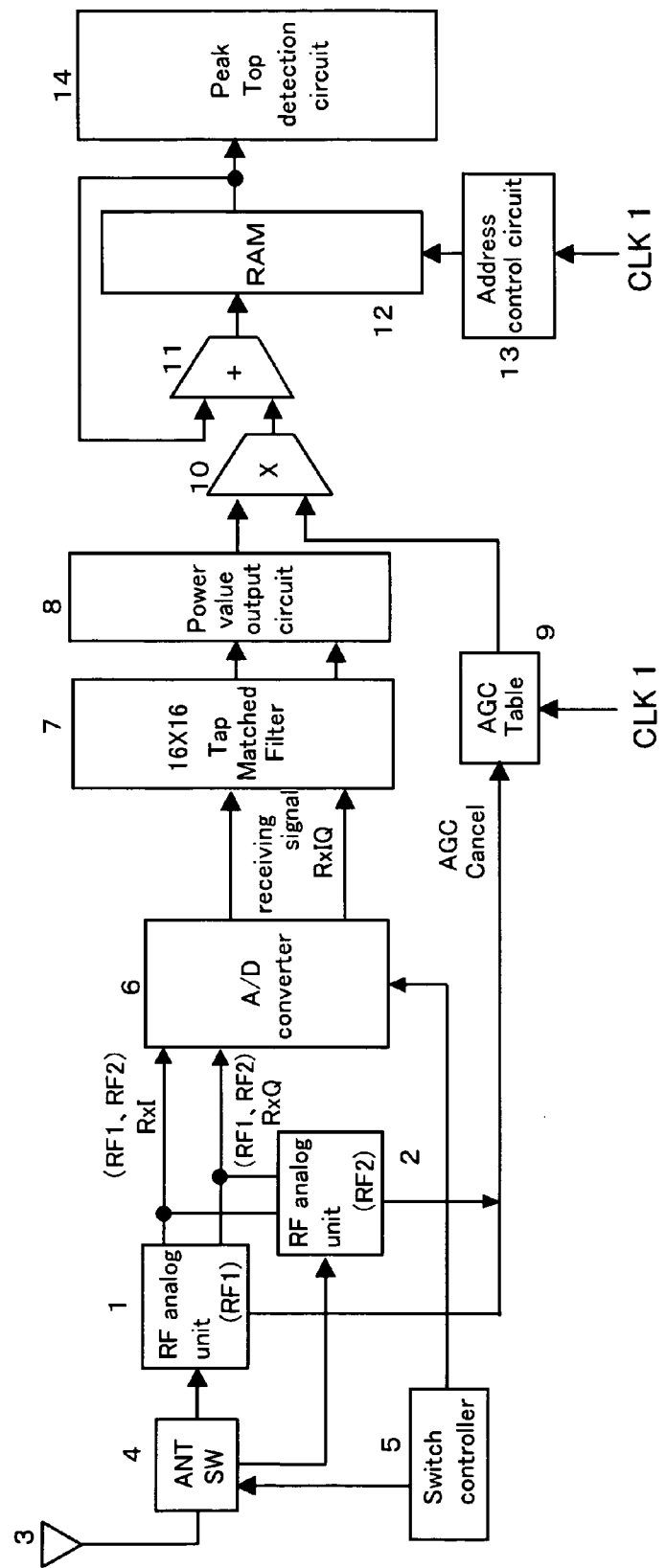
FIG. 2 shows a configuration block diagram of a first embodiment, illustrating a feature of the mobile terminal in accordance with the present invention.
Figure 3:
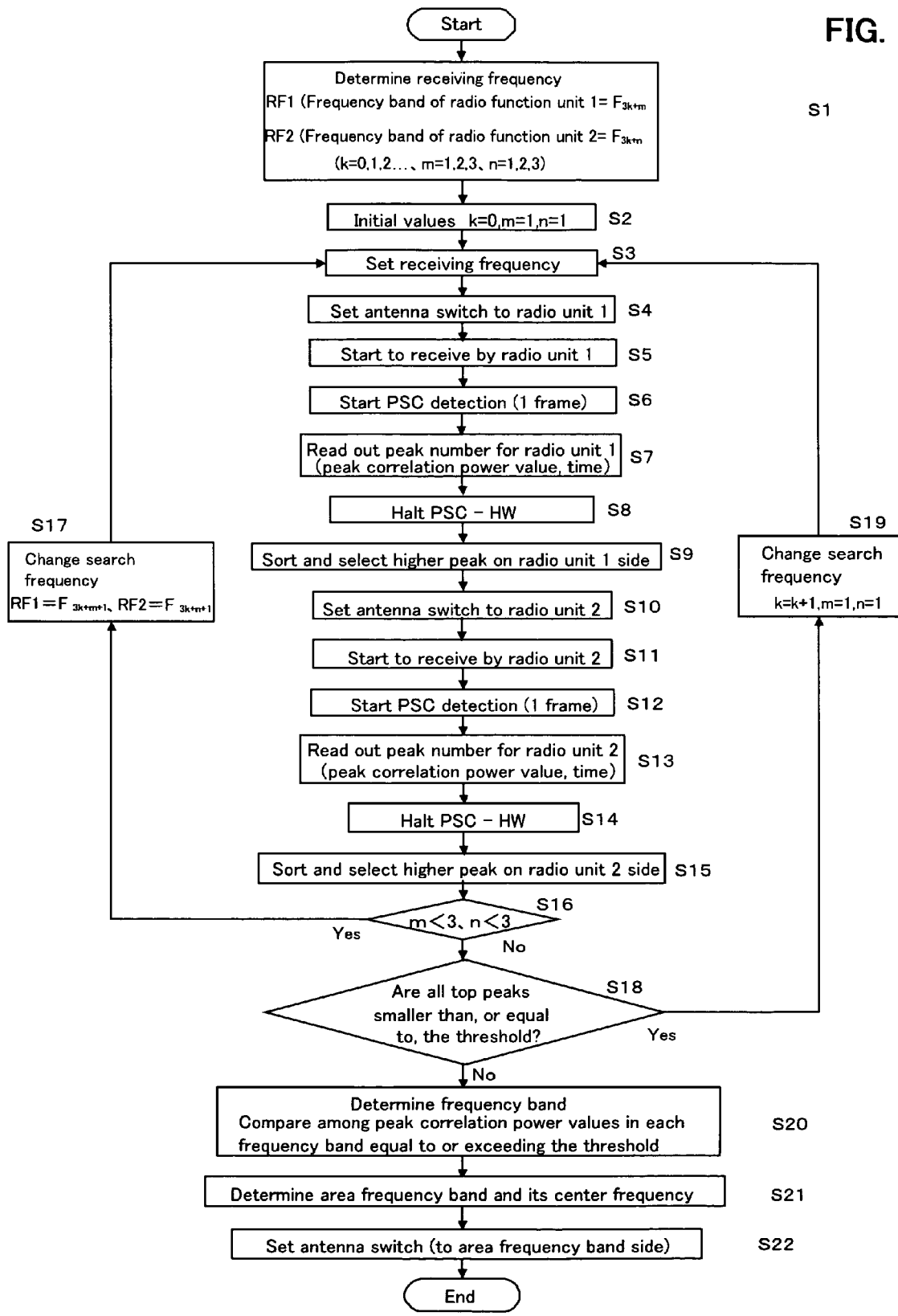
FIG. 3 shows an operation flowchart corresponding to the embodiment shown in FIG. 2.

FIG. 2 shows a configuration block diagram according to a first embodiment of the present invention, illustrating a feature of a mobile terminal (which represents either a Mobile Station or a User Equipment) FIG. 3 shows an operation flowchart corresponding to the embodiment shown in FIG. 2.

As an embodiment of the present invention, there is assumed such a case that two frequency bands are being used in a radio communication system. Two radio function units are provided corresponding to these frequency bands, which is applicable in the other embodiments described later. Here, it is noted that application of the present invention is not limited to a case of a communication system which uses two frequency bands.

Referring to FIG. 2, a signal received by an antenna 3 is input to a first radio function unit 1 or a second radio function unit 2 by controlling to switch an antenna switch 4 from a switch controller 5. Namely, referring to the flowchart shown in FIG. 3, a process for deciding a receiving frequency is performed by switch controller 5 (step S1).

Here, a first receiving band received by the first radio function unit 1, RF1 (=$F_{3k+m}$), and a second receiving band received by the second radio function unit 2, RF2 (=$F_{3k+n}$), are represented. Further, initial values k=0, m=1, n=1 are set (step S2), and a receiving frequency is set accordingly (step S3). The above k is a value which is successively incremented by one, as 0, 1, 2, . . . . Also, m and n are values incremented by one, and circulated from 1 to 3.

The above (3k+m) and (3k+n) means that three frequency groups are selected in each of the two frequency bands. Therefore, m and n respectively have values of 1, 2 to 3.

Now, in the step S2, because the above m=1 and n=1 are set as initial values, the first group is set as receiving frequency among the three frequency groups. Next, antenna switch 4 sets to input receiving signals into the function unit 1 which receives the frequency band RF1 (step S4), and then radio function unit 1 starts the reception (step S5).

With this, radio function unit 1 performs a PSC detection for one frame in the received frequency band RF1 (step S6). Details of this PSC detection operation (step S6) are illustrated below.

In the first radio function unit 1, signals input from antenna switch 4 are demodulated into analog orthogonal signals of I-channel and Q-channel. An A/D converter 6 then converts these analog signals into digital I/Q signals.

Figure 4:
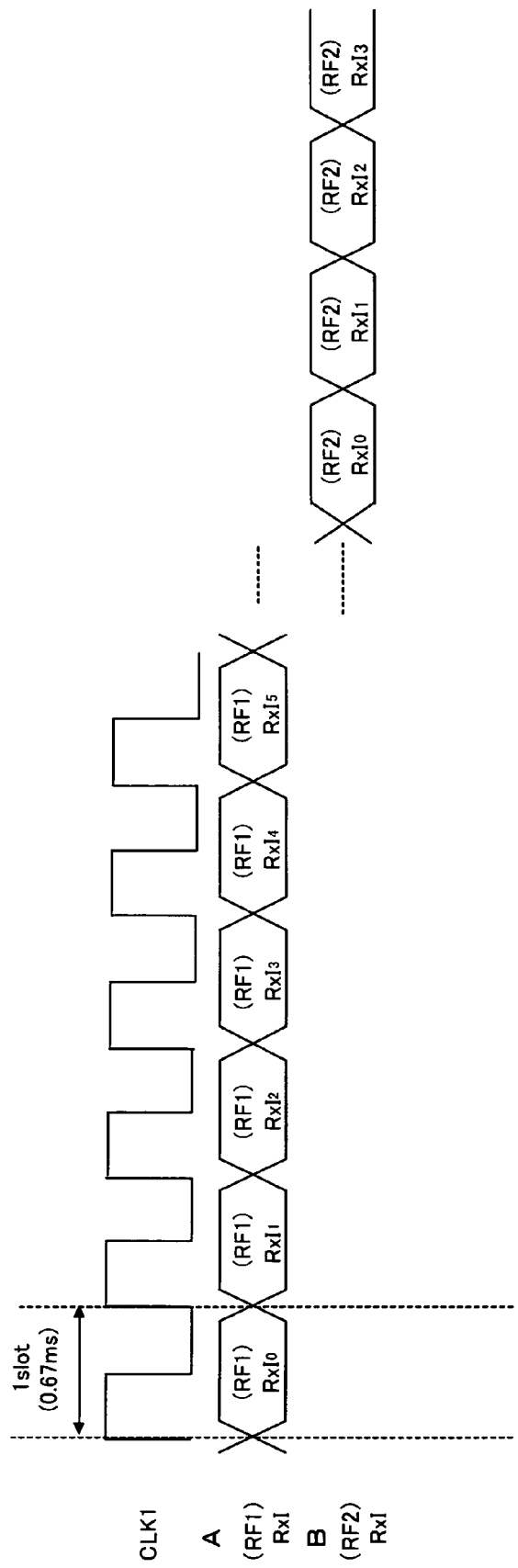
FIG. 4 shows a diagram illustrating step S6 and step S12 shown in FIG. 3.

The above situation is illustrated in FIG. 4. In synchronization with clock signals CLK1 of which period is one slot, 0.67 msec, receiving signals RxI (=RxI0, RxI1, RxI2, RxI3, . . . RxI14) in the first frequency band (RF1) for 15 slots are acquired (FIG. 4A). This situation is also applicable to the Q-channel receiving signals.

The receiving signals in the first frequency group (m=1) of the first frequency band (RF1) are output from A/D converter 6, then input into a matched filter 7 having 16×16 taps, and correlation values with PSC (Primary Search Code) registered in advance are calculated at slot intervals for each oversampling.

Next, the acquired correlation values are converted into corresponding power values or voltage values in a circuit 8. In the embodiment shown in FIG. 2, circuit 8 is exemplified by a power value output circuit. An address control circuit 13 stores the outputs of this power value output circuit 8 word by word into predetermined address locations of a RAM 12. Here, in order to improve reliability of the correlation power value, values for the predetermined number of slots, for example 15 slots, are integrated. To perform this integration, in FIG. 2, the outputs of RAM 12 are feedbacked to an adder circuit 11, in which the power values in a preceding slot and a new slot are integrated and stored into RAM 12.

The integration of the power values is obtained by the following formula 1.

Power Addition:

$$\sum_{n=0}^{14}\left\{\sum_{i,j=1}^{2560}(P_iI_{j,n})^2+\sum_{i,j=1}^{2560}(P_iQ_{j,n})^2\right\} \qquad \text{Formula 1}$$

Further, in case circuit 8 is a voltage output circuit, the integration of the voltage values can be obtained by the following formula 2.

Voltage Addition:

$$\sum_{n=0}^{14}\left\{\left(\sum_{i,j=1}^{2560}P_iI_{j,n}\right)^2+\left(\sum_{i,j=1}^{2560}P_iQ_{j,n}\right)^2\right\} \qquad \text{Formula 2}$$

where $P_i$ denotes PSC (Primary Search Code).

Additionally, the integration of the power values and the integration of the voltage values by use of the above formula 1 and formula 2 are applicable in the other embodiments illustrated later.

Here, a multiplier 10 is a functional circuit provided for correcting nonlinear distortions produced in the first and the second radio function units 1, 2. Namely, the first and the second radio function units 1, 2 include AGC amplifiers having different properties for each frequency, which cause nonlinear properties. To cope with this, an analog conversion table in an AGC table 9 is provided. By inputting correction values having different properties for each frequency into multiplier 10, it becomes possible to correct the nonlinear components included in the outputs of power value output circuit 8.

Referring back the operation flowchart shown in FIG. 3, the correlation power having been integrated and stored in RAM 12 is led in a peak top detection circuit 14. This peak top detection circuit 14 extracts peak points and obtains peak correlation power values and the time (step S7), and halts hardware processing for detecting the PSC against the first radio function unit 1 (step S8).

Peak top detection circuit 14 further sorts the peak values based on the peak correlation power values and the time obtained above, and selects the higher-rank paths having higher peak values (S9).

After the above processing, antenna switch 4 is switched, and sets to input receiving signals into the second radio function unit 2 (step S10). Accordingly, corresponding to the processing of the above-mentioned steps S5-S9 in regard to the first radio function unit 1, the similar processing steps, steps S11-S15, are executed in regard to the second radio function unit 2 for the second frequency band.

In the step S12, as shown in FIG. 4, the I-channel receiving signals RxI (=RxI0, RxI1, RxI2, RxI3, RxI14) in the second frequency band (RF2) are acquired for 15 slots (FIG. 4B) in synchronization with clock signals CLK1 of which period is one slot, 0.67 msec, successively to the receiving signals RxI in the first frequency band (RF1) (FIG. 4A). As to the Q-channel receiving signals, the processing is performed similarly to the above.

The integration of the power values in the second frequency band (RF2) is obtained by the following formula 3.

$$\sum_{n=15}^{29}\left\{\sum_{i,j=1}^{2560}(P_iI_{j,n})^2+\sum_{i,j=1}^{2560}(P_iQ_{j,n})^2\right\} \quad \text{Formula 3}$$

Further, in case circuit 8 is a voltage output circuit, the integration of the voltage values can be obtained by the following formula 4.

Voltage Addition:

$$\sum_{n=15}^{29}\left\{\left(\sum_{i,j=1}^{2560}P_iI_{j,2n+1}\right)^2+\left(\sum_{i,j=1}^{2560}P_iQ_{j,2n+1}\right)^2\right\} \quad \text{Formula 4}$$

where $P_i$ denotes PSC (Primary Search Code).

Additionally, the integration of the power values and the integration of the voltage values by use of the above formula 3 and formula 4 are applicable in the other embodiments illustrated later.

On completion of the above processing of the steps S4-S15 for the first frequency group, m and n are incremented by 1, respectively (step S17), and a new frequency group is set as receiving frequency (step S3). Thus, the above processing is repeated until the processing is completed up to the third frequency group (m=3, n=3) ('No' in step S16).

Next, a decision on a power threshold is performed (step S18). This power threshold decision is controlled in such a way that, when the entire top values detected in the steps S9, S15 are smaller than, or equal to, the predetermined threshold for both the first frequency band and the second frequency band ('Yes' in step S18), it is controlled so that the value k is incremented by one, both m and n are reset to 1, and then the processing steps S3 to S15 are performed (step S19).

In the step S18, when a peak value greater than the threshold is detected ('No' in step S18), in order to determine the frequency band, peak correlation power values greater than the threshold in each frequency band are compared (step S20). Thus, an area frequency band and the center frequency thereof are determined (step S21) Corresponding to the determined area frequency band, antenna switch 4 is switched to either the first radio function unit 1 or the second radio function unit 2 (step S22). As a result, the mobile terminal becomes able to communicate with the corresponding base station.

According to the configuration in the above first embodiment, in particular, as for radio function units 1, 2, only one of the radio function units 1, 2 is operated at the time of the PSC detection, which can be actualized with a simple configuration control.

Second Embodiment

Figure 5:
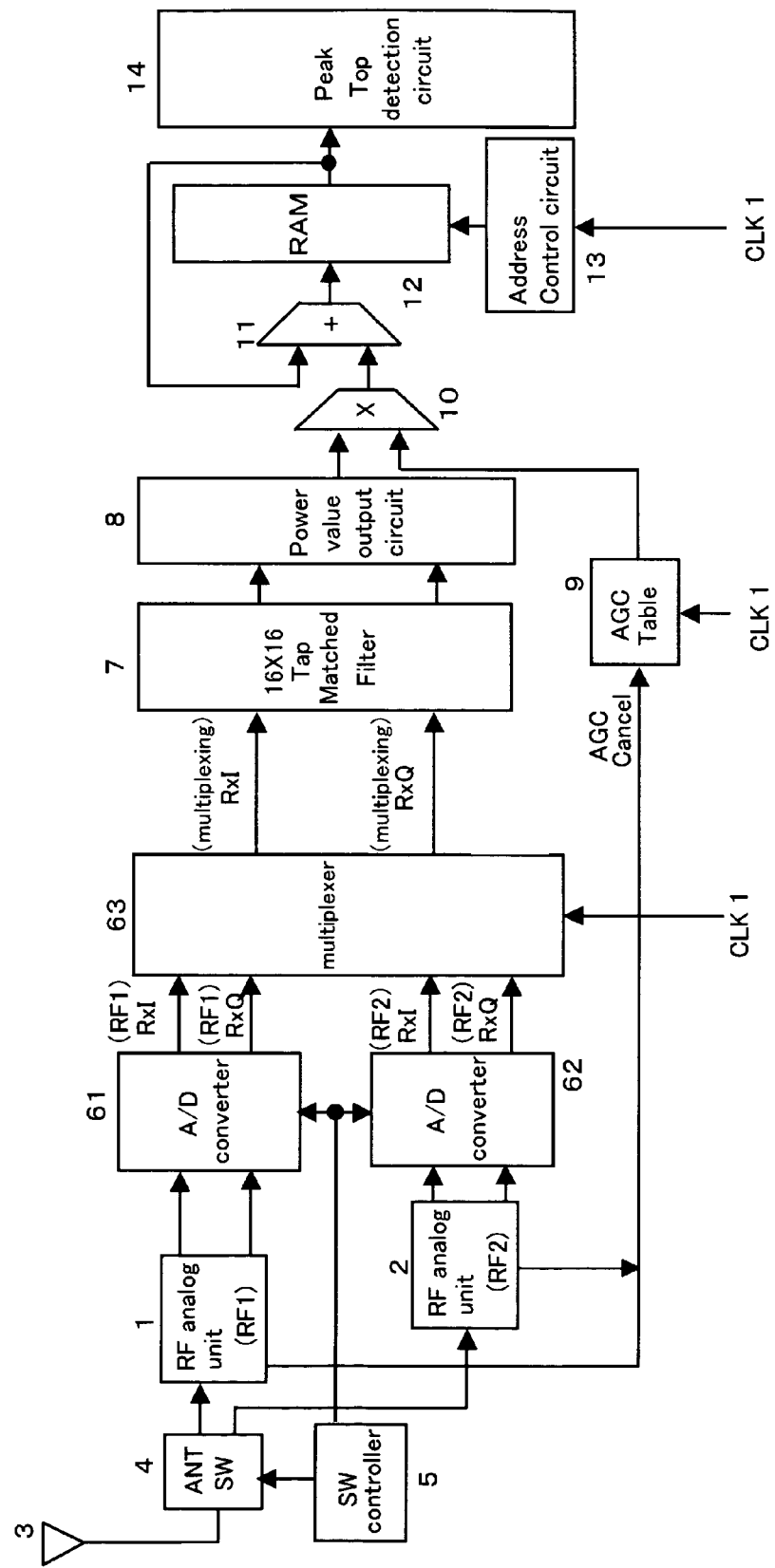
FIG. 5 shows a configuration block diagram of a second embodiment, illustrating a feature of the mobile terminal according to the present invention.
Figure 6:
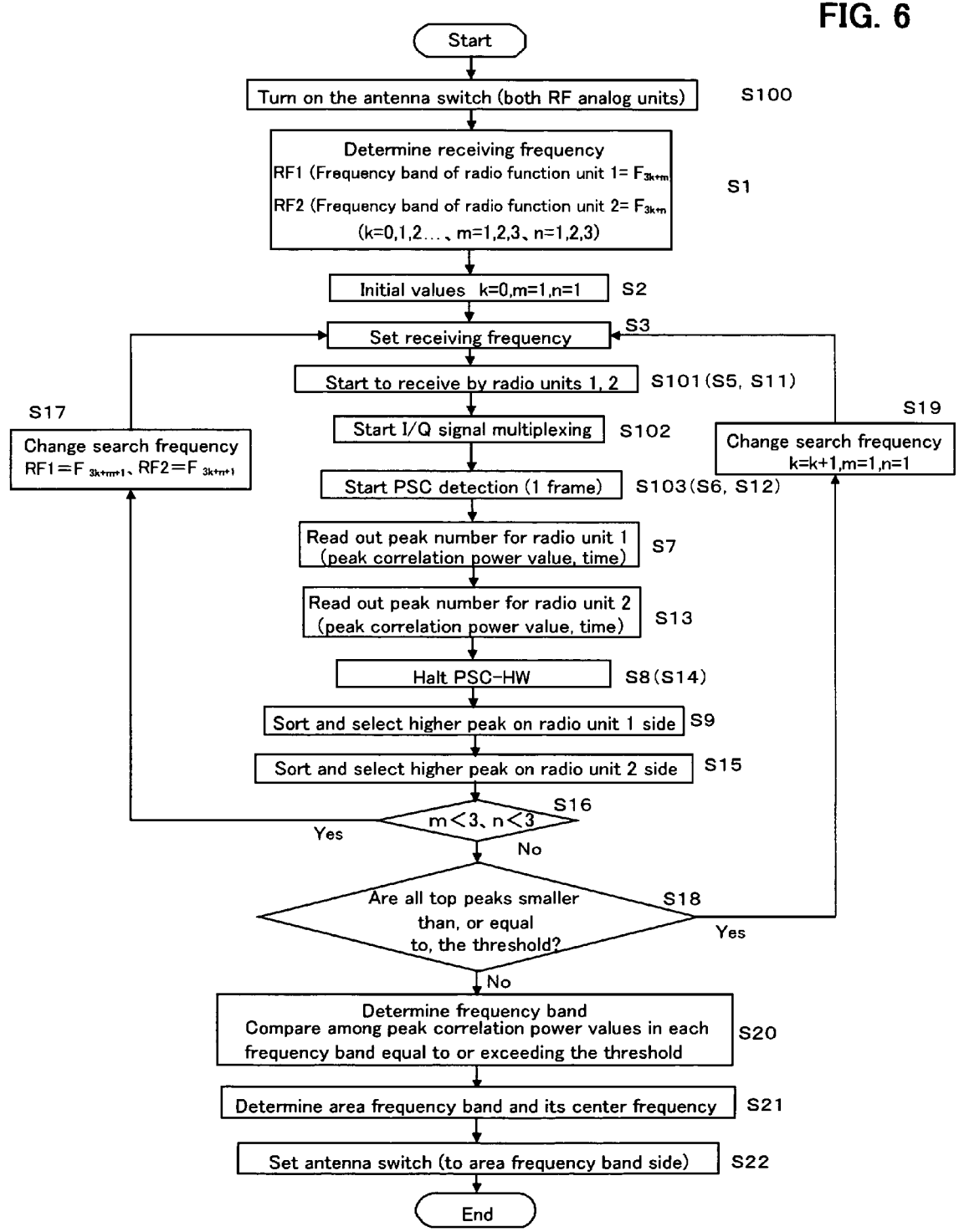
FIG. 6 shows an operation flowchart corresponding to the embodiment shown in FIG. 5.

FIG. 5 shows a configuration block diagram according to a second embodiment of the present invention, in which a feature of the mobile terminal is illustrated. Also, FIG. 6 shows an operation flowchart corresponding to the embodiment shown in FIG. 5.

As having been described earlier, use of two frequency bands in the W-CDMA radio communication system is assumed. Corresponding to these frequency bands, two radio function units 1, 2 are provided. In this embodiment also, application of the present invention is not limited to the communication system which uses two frequency bands.

In FIG. 5, the same reference numerals refer to the parts having the same or similar functions in the embodiment shown in FIG. 2. Therefore, as to these parts, descriptions having been illustrated referring to FIG. 2 will be either omitted or simplified.

As compared with the first embodiment shown in FIG. 2, features of the embodiment shown in FIG. 5 lie in that A/D converter 6 is separated into a first and a second A/D converters 61, 62, and that a multiplexer 63 is provided in the succeeding stage of the first and the second A/D converters 61, 62.

Corresponding to the above differences, the operation flowchart shown in FIG. 6 differs from that shown in FIG. 3. In FIG. 6, the identical reference step numbers are attached to the processing steps similar to the steps in the first embodiment shown in FIG. 3. The operation of the second embodiment is described in the following.

In the embodiment shown in FIG. 5, antenna switch 4 is kept open at all times by switch controller 5 (step S100), and accordingly, signals received by antenna 3 are input to the first and the second radio function units 1, 2 in parallel.

Switch controller 5 determines the receiving frequency of the first and the second radio function units 1, 2 (step S1). The method for determining the receiving frequency here is identical to the method illustrated in the flow shown in FIG. 3.

Namely, a first receiving band received by the first radio function unit 1, RF1 ($=F_{3k+m}$), and a second receiving band received by the second radio function unit 2, RF2 ($=F_{3k+n}$), are represented. Initial values k=0, m=1, n=1 are set (step S2), and a receiving frequency is set (step S3) The above k is a value successively incremented, as 0, 1, 2, .... Here, k, m and n represent the same parameters explained before.

In each of the first radio function unit 1 and the second radio function unit 2, signals of the first frequency band and the second frequency band are input and processed.

In the first radio function unit 1 and the second radio function unit 2, because the above m=1 and n=1 are set as initial values in the step S2, the first group is set as receiving frequency among the three frequency groups (step S3). Next, each radio function unit starts reception, and the first frequency band RF1 and the second frequency band RF2 are received and processed (step S101).

The receiving signal in the first frequency group (m=1) of the first frequency band (RF1) is then converted into a digital signal in A/D converter 61, and the digital signal is output therefrom. Similarly, the receiving signal in the first frequency group (m=1) of the second frequency band (RF2) is converted into a digital signal in A/D converter 62, and the digital signal is output therefrom.

The digital output signals from A/D converter 61 and A/D converter 62 are input into multiplexer 63. In multiplexer 63, the digital output signals from A/D converter 61 and A/D converter 62 are alternatively multiplexed on a slot-by-slot basis. The multiplexed I/Q signals RxI, RxQ are then input into matched filter 7 having 16×16 taps. Thus, the PSC detection is started (step S103) In the PSC detection, the output from multiplexer 63 is input into matched filter 7, and the correlation values with the PSC (Primary Search Code) registered in advance are calculated at slot intervals for each oversampling.

Figure 7:
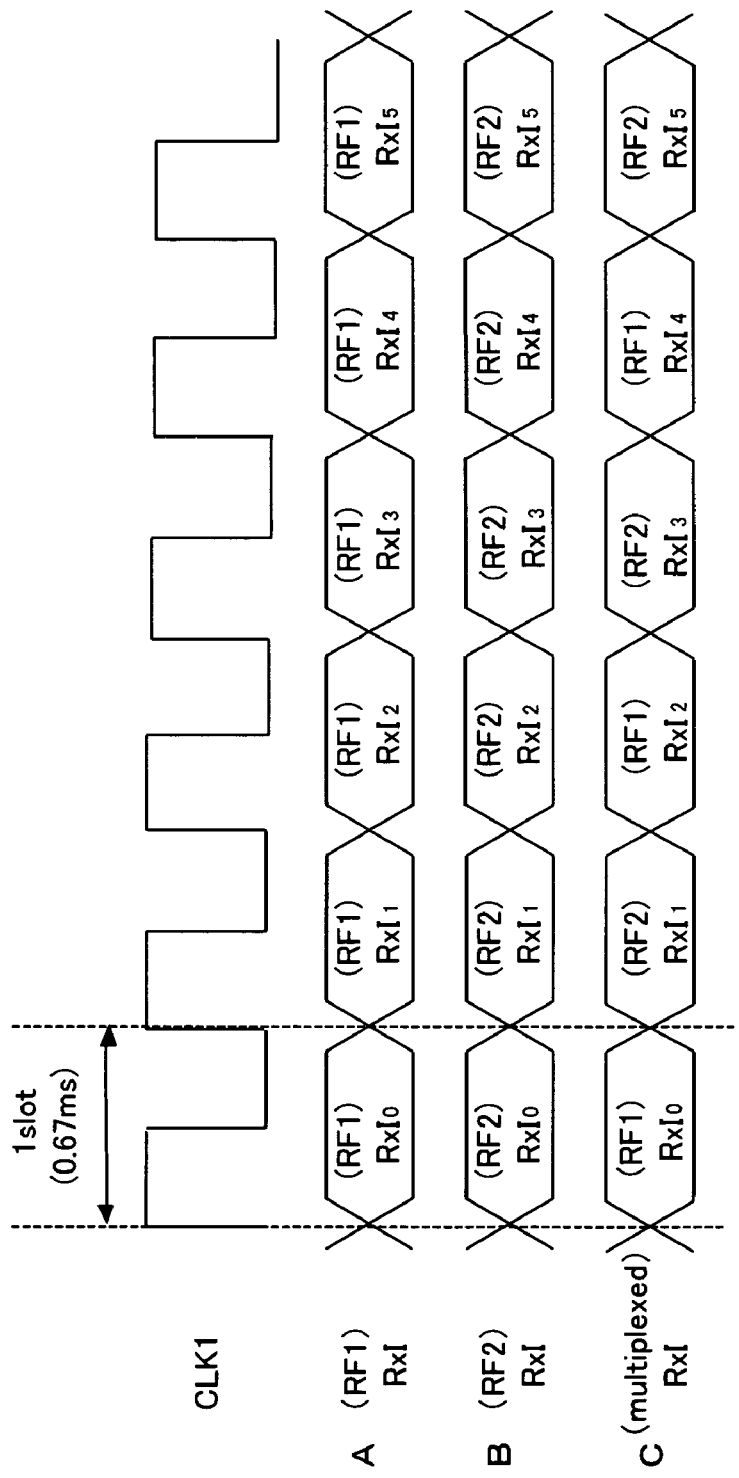
FIG. 7 shows a diagram illustrating processing of a multiplexer 63 in the embodiment shown in FIG. 5.

This situation is illustrated in FIG. 7. In synchronization with clock signals CLK1 of which period is one slot, 0.67 msec, receiving signals RxI (=RxI0, RxI1, RxI2, RxI3, . . . RxI14) of both the first frequency band (RF1) and the second frequency band (RF2) for 15 slots are acquired (FIGS. 7A, 7B).

Further, in multiplexer 63, the receiving signals RxI (=RxI0, RxI1, RxI2, RxI3, . . . RxI14) of the first frequency band (RF1) and the receiving signals RxI (=RxI0, RxI1, RxI2, RxI3, . . . RxI14) of the second frequency band (RF2) are alternately multiplexed. The resultant output becomes (RF1) RxI0, (RF2) RxI1, (RF1) RxI2, (RF2) RxI3, (RF1) RxI4, . . . , as shown in FIG. 7C. The above description is also applicable to the Q-channel receiving signal.

The output of multiplexer 63 is input to matched filter 7 having 16×16 taps, and the correlation values with the PSC (Primary Search Code) registered in advance are calculated at slot intervals for each oversampling.

Next, the acquired correlation values are converted into corresponding power values or voltage values in circuit 8. In the embodiment shown in FIG. 5, circuit 8 forming the power value output circuit is illustrated also. Address control circuit 13 stores the outputs of this power value output circuit 8 word by word into predetermined address locations of RAM 12. Here, in order to improve reliability of the correlation power value, values for the predetermined number slots, for example 6 slots, are integrated. To perform this integration, in FIG. 5, the output of RAM 12 are feedbacked to adder circuit 11, in which power values in a preceding slot and a new slot are integrated, and stored into RAM 12.

Referring back the operation flowchart shown in FIG. 6, the correlation power having been integrated and stored in RAM 12 is led into peak top detection circuit 14. This peak top detection circuit 14 extracts peak points in the first radio frequency band RF1 and the second radio frequency band RF2, and obtains peak correlation power values and the time (steps S7, S13). Peak top detection circuit 14 then halts hardware processing for detecting the PSC (step S8).

Peak top detection circuit 14 further sorts the peak values for each of the first radio frequency band RF1 and the second radio frequency band RF2, based on the peak correlation power values and the time obtained above, and selects higher-rank paths having higher peak values (steps S9, S15).

On completion of the above processing of the steps S101-S15, m and n are incremented by 1, respectively (step S17), and a new frequency group is set as receiving frequency (step S3). Thus, the above processing is repeated until the processing is completed up to the third frequency group (m=3, n=3) (step S16).

Next, a decision on a power threshold is performed (step S18). The power threshold decision is controlled in such a way that, when the entire top values detected in the steps S9, S15 are smaller than, or equal to, the predetermined threshold for both the first frequency band and the second frequency band ('Yes' in step S18), the value k is incremented by one, the values m and n are reset to 1, and thereafter the processing steps S3 to S15 are performed (step S19).

In the step S18, when a peak value greater than the threshold is detected ('No' in step S18), in order to determine the frequency band, peak correlation power values greater than the threshold in each frequency band are compared (step S20). Through the above procedure, a path having a greater peak correlation power value is determined as an area frequency band, and the center frequency thereof are determined (step S21). Corresponding to the determined area frequency band, antenna switch 4 is switched to the first radio function unit 1 or the second radio function unit 2 (step S22). As a result, the mobile terminal becomes able to communicate with the corresponding base station.

According to the above second embodiment, in particular, the receiving signals of the first frequency band and the second frequency band are multiplexed using multiplexer 63. This brings about an effect such that simultaneous and real-time detection of the radio wave conditions becomes possible on both frequency bands in a short time.

Third Embodiment

Figure 8:
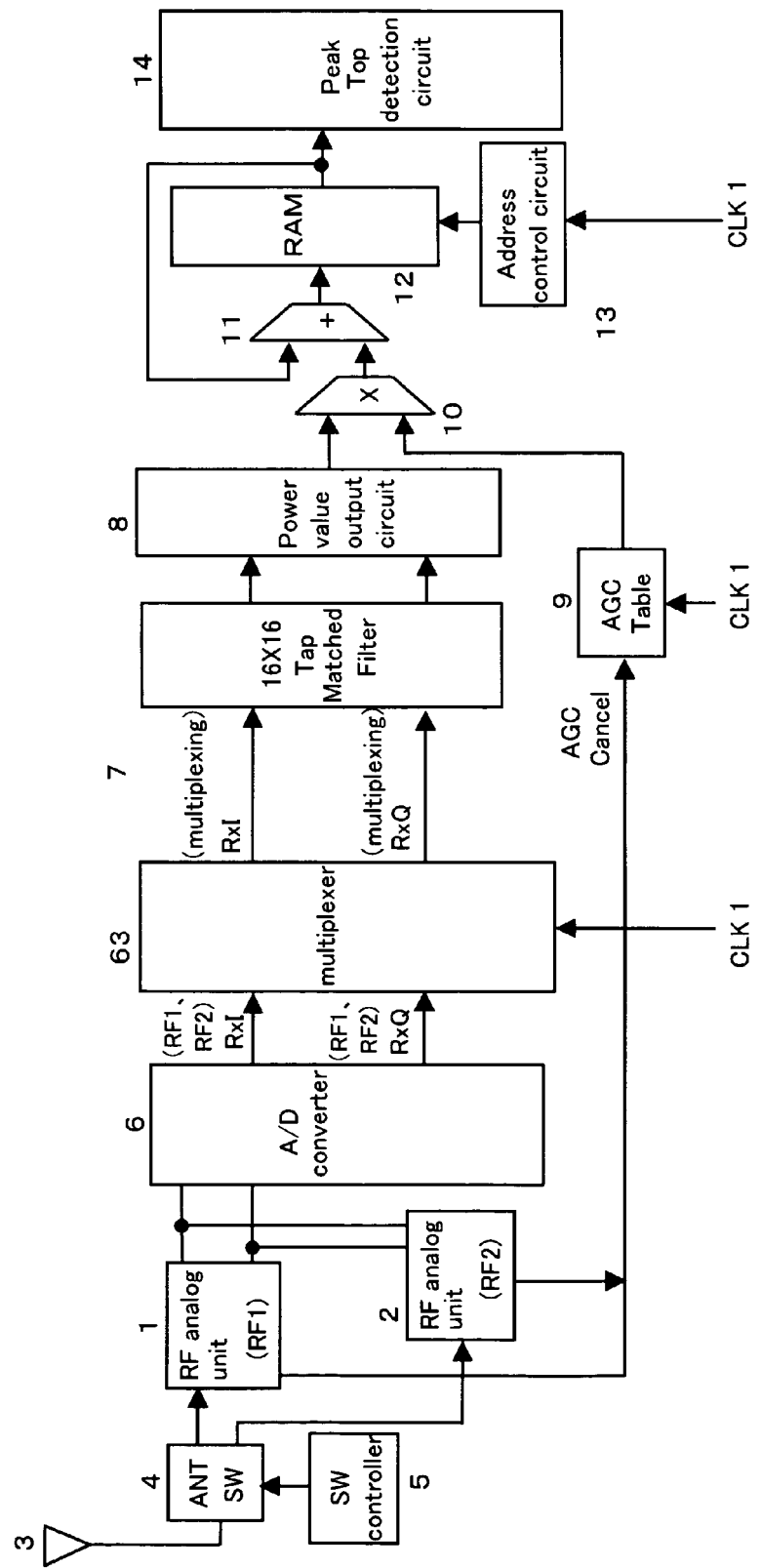
FIG. 8 shows a configuration block diagram of a third embodiment, illustrating a feature of the mobile terminal according to the present invention.
Figure 9:
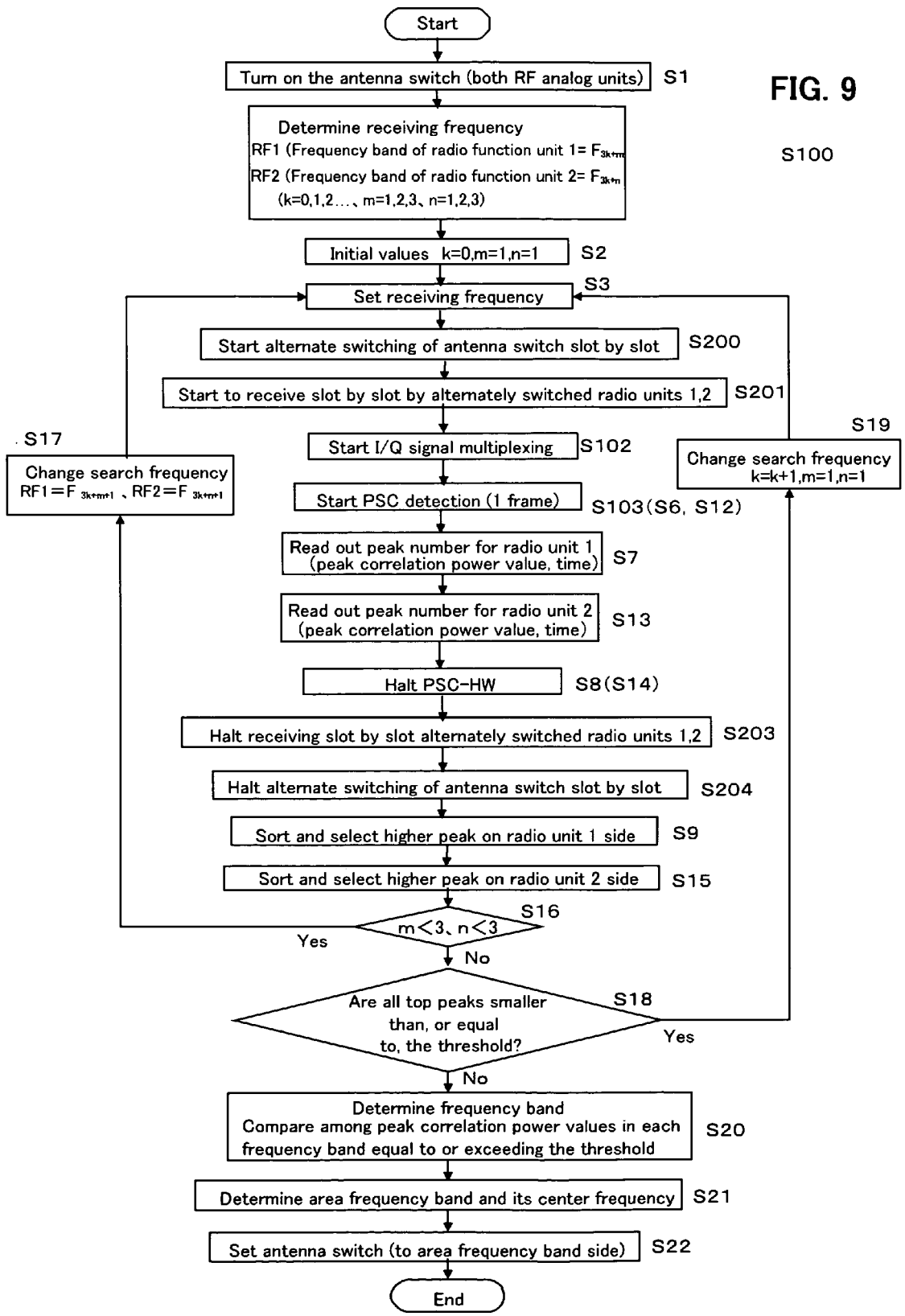
FIG. 9 shows an operation flowchart corresponding to the embodiment shown in FIG. 8.

FIG. 8 shows a configuration block diagram according to a third embodiment of the present invention, illustrating a feature of the mobile terminal. FIG. 9 shows an operation flowchart corresponding to the embodiment shown in FIG. 8.

As having been described earlier, use of two frequency bands in the W-CDMA radio communication system is assumed. Corresponding to these frequency bands, two radio function units 1, 2 are provided. Also in this embodiment, application of the present invention is not limited to the communication system which uses two frequency bands.

The identical reference numerals refer to the parts having the same or similar functions in the first and second embodiments shown in FIGS. 2, 5. Therefore, as to these parts, descriptions having been illustrated referring to FIGS. 2, 5 will be either omitted or simplified in the follow explanation.

Features of the embodiment shown in FIG. 8, as compared with the first and second embodiments shown in FIGS. 2, 5, lie in that a single A/D converter 6 is provided, similarly to the embodiment shown in FIG. 2, and further, a multiplexer 63 is provided in the succeeding stage of A/D converter 6, similarly to the embodiment shown in FIG. 5.

Corresponding to the above differences, the operation flowchart shown in FIG. 9 is different from the figures of the first and the second embodiment. In FIG. 9, the identical reference step numbers are attached to the processing steps similar to the steps in the first and second embodiments shown in FIGS. 3, 6. The operation of the third embodiment is described in the following.

In the embodiment shown in FIG. 8, a feature lies in that antenna switch 4 is switched on a slot-by-slot basis by switch controller 5.

The processing steps from S1 up to S3 are identical to the processing steps in the first embodiment shown in FIG. 2. In the third embodiment, processing is started by switching of antenna switch 4 by switch controller 5 on a slot-by-slot basis (step S200). Accordingly, the receiving signals alternately switched slot by slot are input to the first radio function unit 1 and the second radio function unit 2 (step S201).

The receiving signal is input alternately to the first radio function unit 1 and the second radio function unit 2 slot-by-slot, and the outputs of the radio function units 1, 2 are multiplexed in multiplexer 63 (step S102). The processing up to the step S8 after multiplexing is similar to that of the second embodiment.

Further, the alternate switching of the first radio function unit 1 and the second radio function unit 2 on a slot-by-slot basis is halted (steps S203, S204). Thereafter, the processing from the step S9 to the step S22 is performed in a similar way to the second embodiment.

Figure 10:
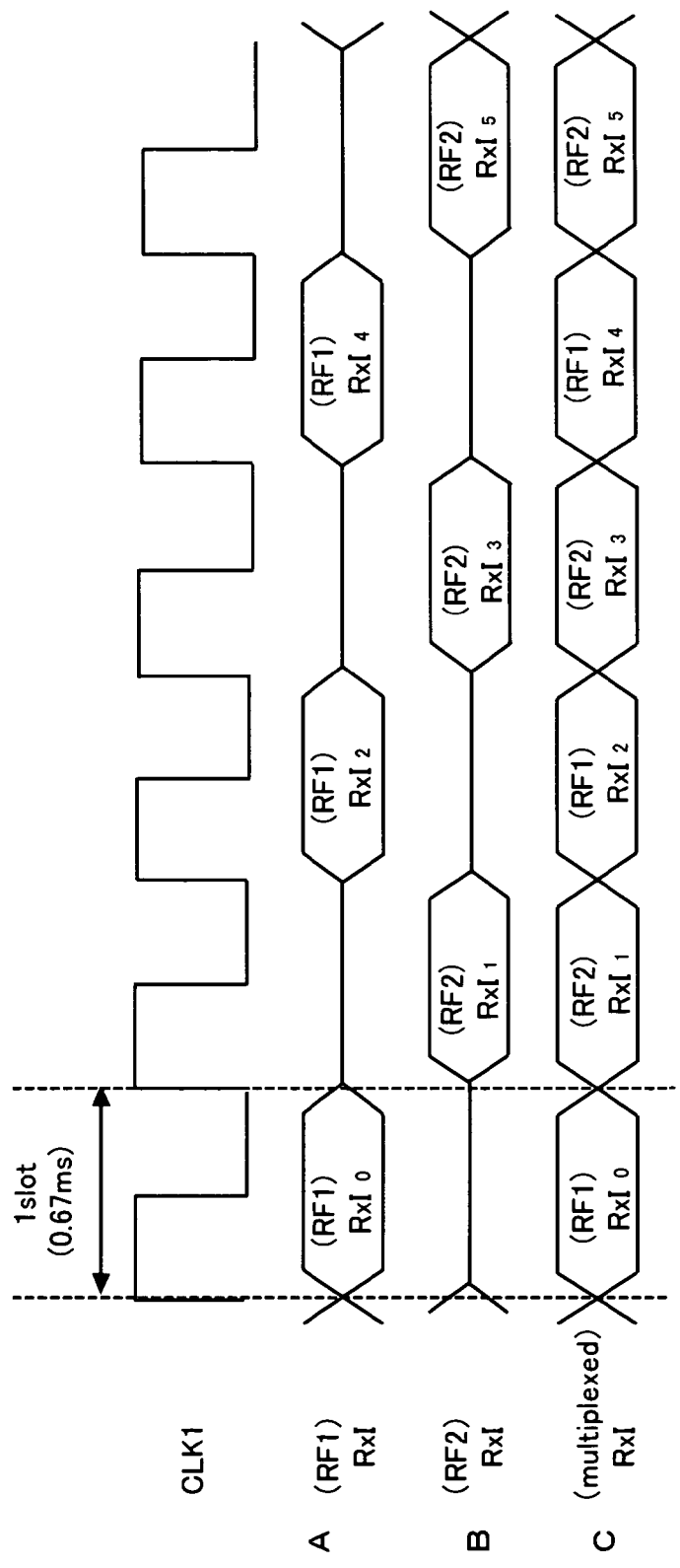
FIG. 10 shows a diagram illustrating processing of a multiplexer 63 in the embodiment shown in FIG. 8.

The processing situation of the steps S201, S102 in the third embodiment is illustrated in FIG. 10. In synchronization with clock signals CLK1 of which period is one slot 0.67 msec, receiving signals of the first frequency band (RF1) and the second frequency band (RF2) are alternately acquired. Namely, the receiving signals of the first frequency band (RF1) are existent every other slot, and thus the signals RxI (=RxI0, RxI2, RxI4, . . . ) are obtained. Similarly, the receiving signals of the second frequency band (RF2) are also existent every other slot, and thus the signals RxI (=RxI1, RxI3, RxI5, . . . ) are obtained.

Accordingly, in multiplexer 63, the receiving signals RxI (=RxI0, RxI2, . . . ) of the first frequency band (RF1) and the receiving signals RxI (=RxI1, RxI3, RxI5, . . . ) of the second frequency band (RF2) are multiplexed. The resultant output becomes (RF1) RxI0, (RF2) RxI1, (RF1) RxI2, (RF2) RxI3, (RF1) RxI4, . . . , which is the same as that obtained in the multiplexed result in the second embodiment shown in FIG. 5. The situation on the Q-channel receiving signals is similar to that described above.

Next, an area frequency decision method in each embodiment described above will be discussed hereafter. When peak top detection circuit 14 sorts the peaks obtained in the first radio frequency band RF1 and the second radio frequency band RF2, respectively, and selects higher-rank paths having higher peak values (steps S9, S15), which frequency band is employed as an area frequency band is determined in the steps S20-S22.

The above third embodiment has such features that the radio wave condition of the first and the second frequency bands at a certain time can be detected promptly in real time by multiplexing, similarly to the second embodiment, and further only one radio function unit is required to operate when detecting the PSC, similarly to the first embodiment.

Embodiment of Area Frequency Decision Method

To decide the area frequency described above, the following methods can be implemented: (i) simply comparing maximum correlation values detected in each frequency; (ii) deciding by comparing total integral power values of the peak correlation values detected in each frequency in consideration of the multipath, etc.; (iii) deciding by comparing the maximum correlation values detected in each frequency, combined with comparing the total intensities of the peak correlation values detected in each frequency; (iv) comparing average peak correlation values greater than the threshold; and (v) deciding by comparing the average values in combination with the variances.

Here, typical examples of the above methods (i) to (iii) will be described in the following.

Figure 11:
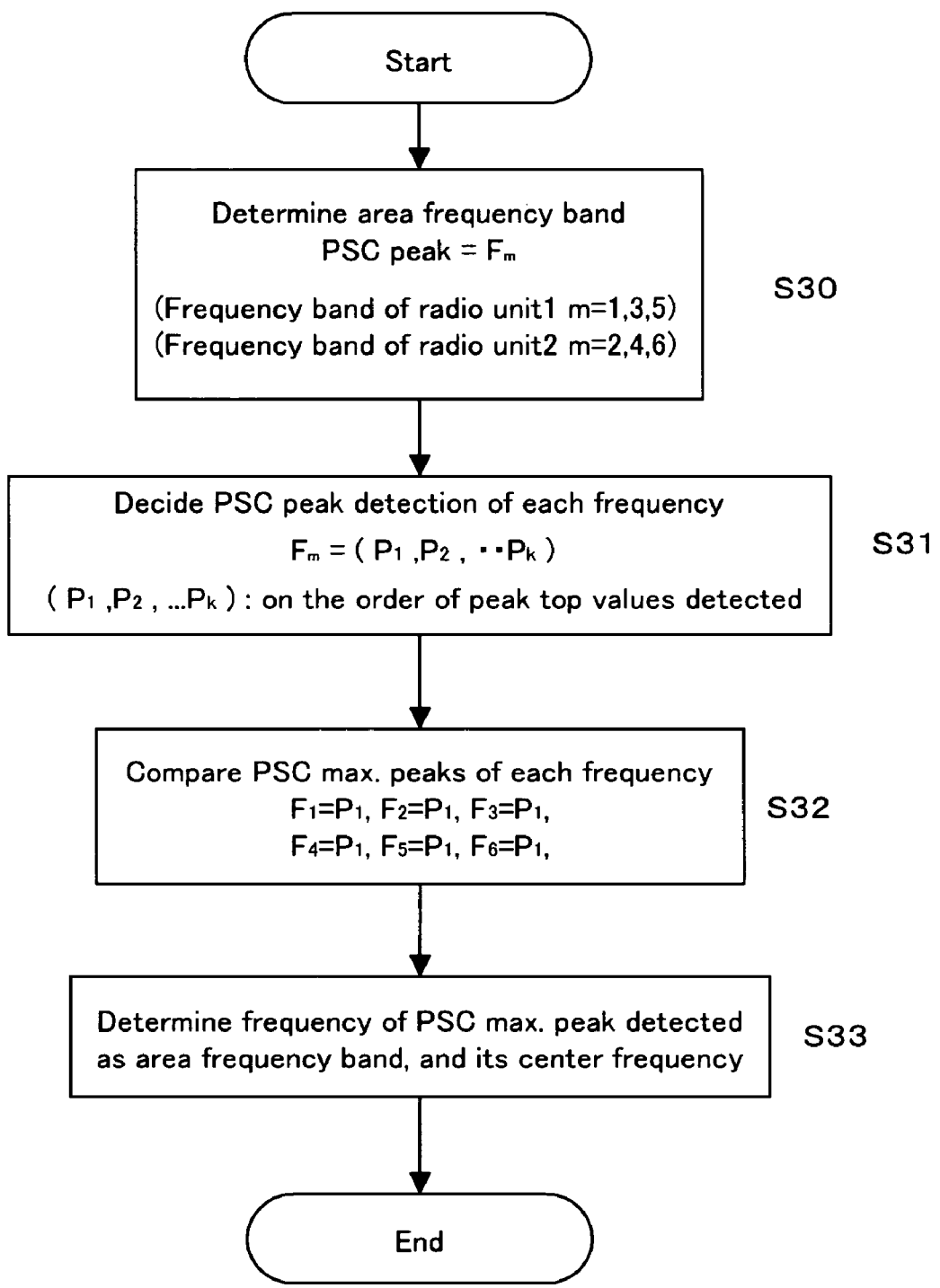
FIG. 11 shows a flowchart illustrating a method (i) of an area frequency decision method.

As to the method (i), simply comparing maximum correlation values detected in each frequency, an exemplary operation flowchart is shown in FIG. 11. Peak values in three frequency bands Fm (m=1, 3, 5) and Fm (m=2, 4, 6) in the first radio function unit 1 and the second radio function unit 2, respectively, are acquired (step S30). The acquired peak values are then sorted in order of the peak magnitude (step S31). Next, maximum peak values in each frequency are compared (step S32).

As a result this comparison, the frequency band in which the maximum PSC peak is detected is determined as the area frequency band, and the center frequency thereof is determined as the frequency for communication with the corresponding base station (step S33).

The method (ii), namely the method of comparing total integral power values of the peak correlation values detected in each frequency in consideration of the multipath, etc., is as follows: Peak power values having correlation power values greater than a certain value are integrated in each frequency. Next, the integral values of each frequency are compared, and the frequency having the highest integral power value is determined as the center frequency of the area frequency.

Figure 12:
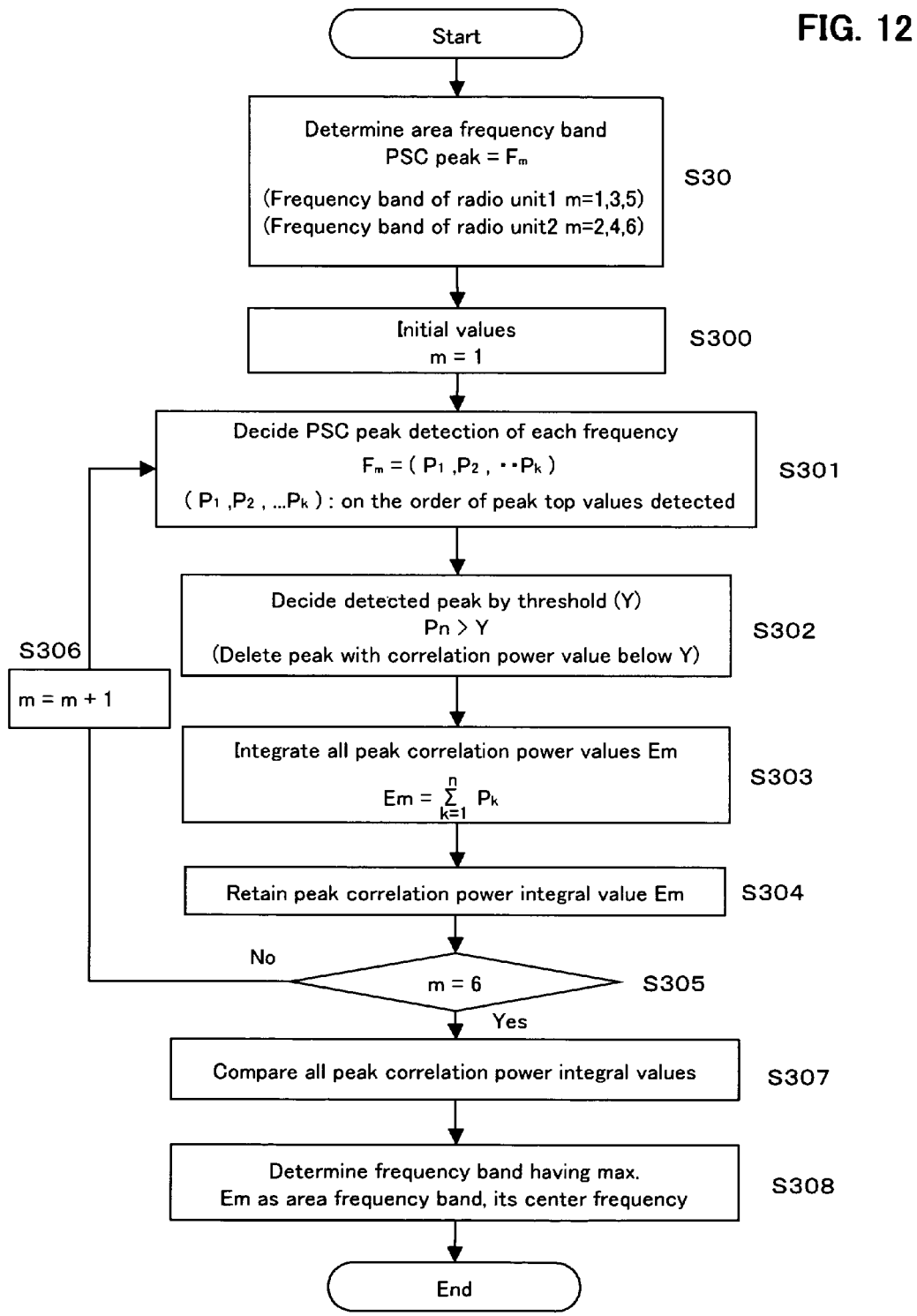
FIG. 12 shows a flowchart illustrating a method (ii) of an area frequency decision method.

More specifically, referring to FIG. 12 illustrating the processing of the method (ii), first, peak values in three frequency bands Fm (m=1, 3, 5) and Fm (m=2, 4, 6) in the first radio function unit 1 and the second radio function unit 2, respectively, are acquired (step S30). Next, by setting m=1 as the initial value (step S300), PSC peak detection values in each frequency are determined (step S301). At this time, if the determined PSC peak detection value is no greater than a predetermined threshold Y, this value is deleted from the PSC peak detection values (step S302).

Subsequently, by integrating the peak values no less than the threshold Y, peak correlation power integral values Em are acquired (step S303), and the acquired values are retained (step S304). Next, the internal value m=1 is incremented (step S306), and the above processing is performed for six frequencies, up to m=6 (step S305).

Thereafter, all peak correlation power integral values Em are compared, and the Em having the greatest value among the values E1-E6 is selected (step S307). The frequency band corresponding to the selected maximum value among the peak correlation power integral values Em is determined as the area frequency band, and the center frequency thereof is determined as the frequency for communicating with the corresponding base station (step S308).

Figure 13:
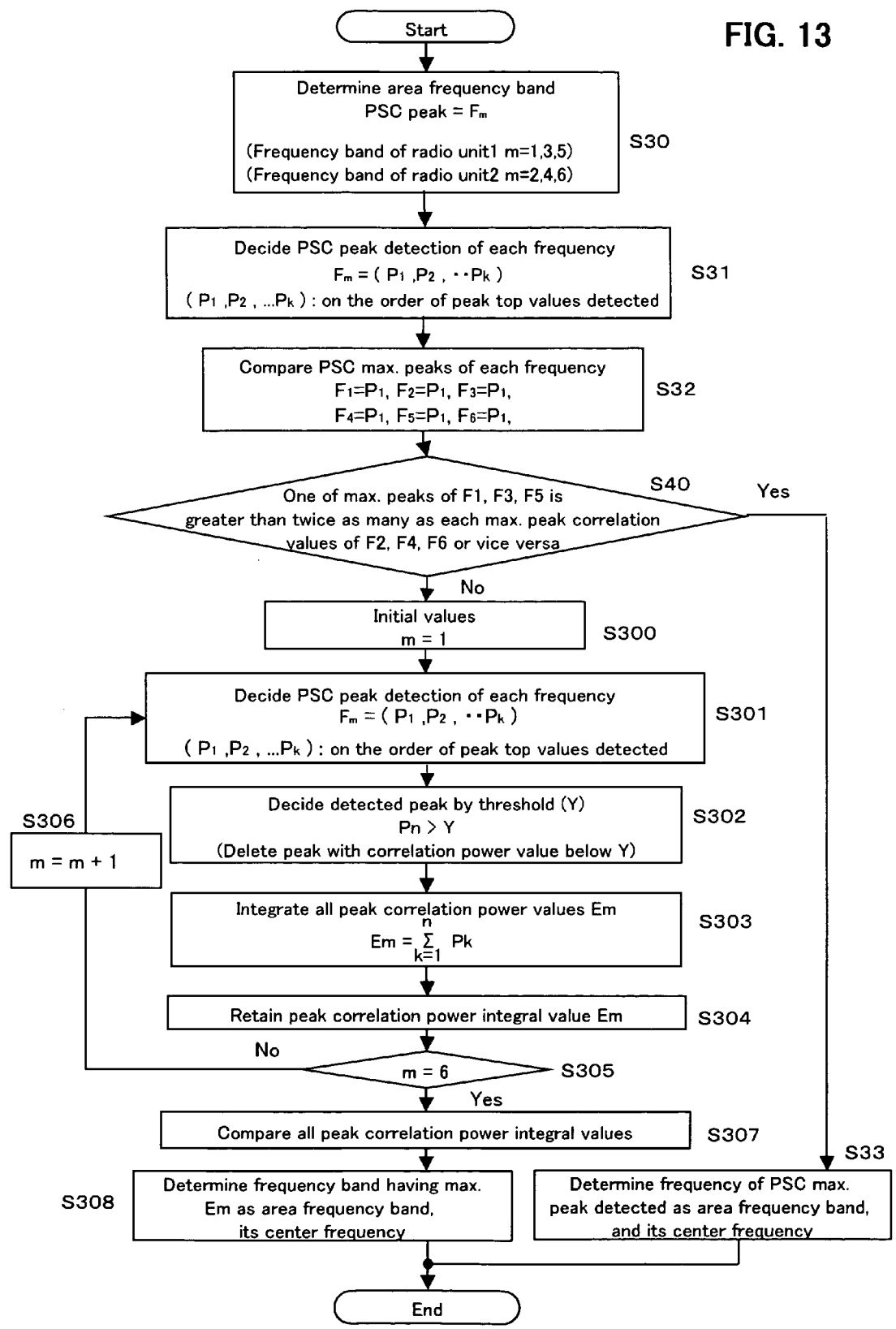
FIG. 13 shows a flowchart illustrating a method (iii) of an area frequency decision method.

The method (iii) is obtained by combining the above-mentioned methods (i) and (ii), the flowchart of which is shown in FIG. 13. For the same processing steps corresponding to the processing steps in the methods (i) and (ii) shown in FIGS. 11, 12 are illustrated using the same reference symbols.

Figure 14:
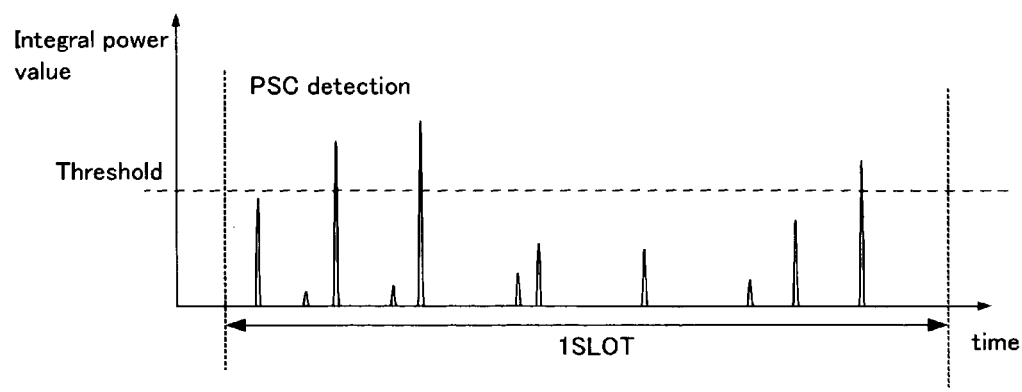
FIG. 14 shows a diagram illustrating a multipath or a multi-cell environment, in which a multiplicity of peaks exceeding a threshold are detected in integral power values.
Figure 15:
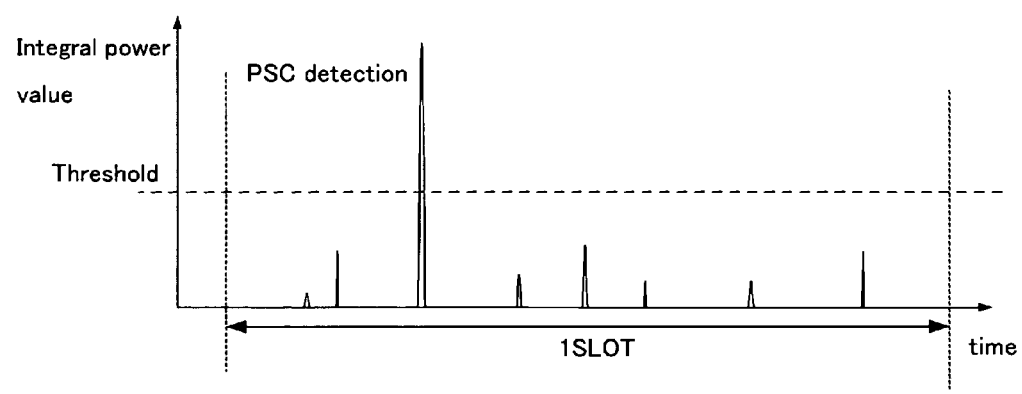
FIG. 15 shows a diagram illustrating a single cell environment, in which only one peak having a large correlation value is detected in integral power values.

This method is advantageous when comparing a case of a multipath or multiple cell environment, which produces a multiplicity of detected peaks having greater than the threshold in the integral power values (refer to the step S307) shown in FIG. 14, with a case of a single cell environment, which produces only one peak of a great correlation value as shown in FIG. 15.

When comparing a frequency band of a multiplicity of peaks having greater than the threshold being existent as shown in FIG. 14, with a frequency band in a single cell environment as shown in FIG. 15, the above method (ii) may possibly result in a failure of detecting the frequency having the greatest correlation value shown in FIG. 15.

To cope with such a problem, first, the method (i) is employed so as to enable the determination even under the single cell environment shown in FIG. 15. The top peaks in each frequency band are compared. If one of the maximum peak correlation values detected on the first radio function unit 1 side is more than twice as great as each maximum peak correlation value detected on the second radio function unit 2 side, or oppositely, that is, if one of the maximum peak correlation values detected on the second radio function unit 2 side is more than twice as great as each maximum peak correlation value detected on the first radio function unit 1 side ('Yes' in step S40), the frequency having the maximum peak is determined as the center frequency, and the corresponding frequency band is determined as area frequency band (step S33). On the other hand, in the case of less than twice ('No' in step S40), the environment is determined to be either a multipath environment or many other cells being existent, and the area frequency determination is performed using the method (ii) (refer to the processing of the step S300 and subsequent steps shown in FIG. 13).

Another Application Example of the Present Invention

In the above description, a radio communication system employing a plurality of frequency bands has been stated, as one solution to cope with the problem of system capacity saturation, etc. caused by the increase of subscribers. However, the present invention is applicable to a radio communication system using a plurality of frequencies, despite a plurality of frequency bands not in use (for example, a radio communication system based on W-CDMA).

Namely, in the W-CDMA communication system, a base station which transmits a Common Pilot Channel (CPICH) to provide such a good receiving environment as satisfying conditions of receiving quality and a receiving level is selected as an object base station to gain access or as a base station of a cell to move in.

Here, because it is difficult to directly acquire a despreading timing of CPICH, the so-called three-step cell search is performed, as described earlier. More specifically, in the first step, P-SCH (Primary Synchronization Channel) is despread using a predetermined spread code, and slot synchronization is accomplished by detecting a timing with which correlation is obtained. Next, in the second step, by despreading S-SCH (Secondary Synchronization Channel) using a predetermined spread code, establishment of frame synchronization, identification of a scrambling code group, and acquisition of the despreading timing of CPICH are performed. Thereafter, in the third step, despreading is performed at the despreading timing when CPICH has been acquired, and the receiving quality and the receiving level are measured. The base station transmitting CPICH which satisfies a predetermined condition is selected as an object base station to gain access or as a base station of a cell to move in.

In the W-CDMA radio communication system, it may also be possible to use an identical signal frequency in the entire base stations, because channel division is performed by use of a code. However, since there lies a limit in the number of codes that can be multiplexed into one frequency, when increasing the system capacity, bringing control channels (CPICH, P-SCH, S-SCH, etc.) and communication channels (DPDCH, etc.) together are respectively transmitted on a first frequency and a second frequency. In this case, the first frequency may belong to the same frequency band as the second frequency, or otherwise, the first frequency and the second frequency may belong to separate, and different, frequency bands.

In any case, as one modification of the embodiment, in the above case, the correlation on P-SCH in the first frequency and the correlation on P-SCH in the second frequency are calculated first. Namely, for any of the first frequency and the second frequency, the first step of the three-step cell search is performed, without immediately proceeding to the second step.

At this point, the frequency side which is assumed to have generally good P-SCH correlation is identified. For example, one of the frequencies having a greater correlation value on the average is identified. Thereafter, as to the identified frequency, the second step and the third step are performed. In contrast, as to the other frequency, processing neither proceeds to the second step nor the third step. Then, as to the frequency in which the process has proceeded to the third step, when the receiving condition of the CPICH having been acquired satisfies a criterion, a base station (frequency) transmitting the most satisfactory CPICH within the frequency concerned is selected for performing waiting operation, etc. As to the other frequency, it is recommended to perform the above processing when no CPICH satisfying the criterion is detected in the identified frequency.

In the above example, the frequency which is assumed to have satisfactory correlation of P-SCH as a whole is identified. However, it is also possible to select the predetermined number of frequencies among the frequencies in order of large P-SCH correlation, and the three-step cell search may be performed for the selected frequencies up to the third step, while the cell search is suspended at the first step for the remainder frequencies.

Further, in the above example, the object frequencies for proceeding to the third step of cell search are extracted first in the correlation of P-SCH. However, it is also possible to obtain the correlation of S-SCH for the first frequency and next that for the second frequency. Thereafter, based on the correlation, the object frequencies for proceeding to the third step of the cell search are determined.

According to the present invention, corresponding to two frequencies or more used in the W-CDMA radio communication system, it becomes possible to decide, within a short time, whether any area frequency is existent at the time of the power switched on the mobile terminal, so as to decide whether the terminal is located inside a service area. Also, recognizing the area frequency in advance enables location registration into the cell in which large electric field intensity can securely be obtained. As a result, an efficient mobile terminal for the W-CDMA radio communication system can be provided.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A mobile terminal for use in a radio communication system employing W-CDMA system having a plurality of frequency bands, comprising:
   a plurality of radio function units corresponding to the plurality of frequency bands;
   a circuit for acquiring a correlation value between each signal received in the plurality of radio function units and a primary search code in each synchronization channel of the plurality of frequency bands;
   an integration circuit integrating outputs of the circuit for acquiring the correlation value; and
   a peak value detection circuit detecting peak values in the outputs of the integration circuit and comparing the detected peak values among the plurality of frequency bands,
   wherein in the peak value detection circuit determines a frequency band which includes the frequency having the greatest detected peak value as area frequency band and sets said frequency having the greatest detected peak value as center frequency.

2. The mobile terminal according to claim 1,
wherein outputs of the plurality of radio function units are switched frame by frame, each frame having a plurality of slots, and then input to the circuit for acquiring the correlation value.

3. The mobile terminal according to claim 1, further comprising a multiplexer,
wherein outputs of the plurality of the radio function units are input to the multiplexer, and the outputs of the plurality of the radio function units are alternately selected and multiplexed slot by slot in a frame having a plurality of slots.

4. The mobile terminal according to claim 1, further comprising a multiplexer,
wherein outputs of the plurality of the radio function units are alternately selected slot by slot in a frame having a plurality of slots, and then input to the multiplexer, and thereby the outputs of the plurality of radio function units are alternately multiplexed.

5. A mobile terminal for use in a radio communication system employing W-CDMA system having a plurality of frequency bands, comprising:
a plurality of radio function units corresponding to the plurality of frequency bands;
a switch successively switching the plurality of radio function units and outputting an I/Q orthogonal signal of a corresponding frequency band;
a matched filter calculating a correlation power value between a primary search code in a synchronization channel and the I/Q orthogonal signal at slot intervals for each oversampling;
an integration circuit integrating each calculated correlation power value in a predetermined integration time;
a means extracting peak points from among the outputs of the integration circuit, sorting the extracted peak points, and detecting higher-rank paths of the correlation power values; and
a means determining an area frequency by comparing the peak correlation power values retained before in regard to the detected higher-rank paths.

6. A mobile terminal for use in a radio communication system employing W-CDMA system having a plurality of frequency bands, comprising:
a plurality of radio function units which corresponds to the plurality of frequency bands and outputs an orthogonal signal from each input signal of the corresponding frequency band;
a switch which switches the plurality of radio function units corresponding to the plurality of frequency bands;
an A/D converter which converts each orthogonal signal from the plurality of radio function units into a digital I/Q signal;
a multiplexer which performs time-division multiplexing of the digital I/Q signals from the A/D converter;
a matched filter which calculates a correlation power value between an output of the multiplexer and a primary search code at slot intervals of a frame having a plurality of slots for each oversampling;
a power value output circuit integrating outputs of the matched filter for each I/Q signal, and outputting integrated correlation power values;
a means extracting peak points from among the outputs of the power value output circuit, sorting the extracted peak points, and detecting higher-rank paths of the correlation power values; and
a means determining an area frequency by comparing the peak correlation power values stored in a memory in regard to the detected higher-rank paths.

* * * * *